US011868940B2

United States Patent
Trivelpiece et al.

(10) Patent No.: US 11,868,940 B2
(45) Date of Patent: Jan. 9, 2024

(54) METHODS AND SYSTEMS FOR MONITORING WORKERS IN A RETAIL ENVIRONMENT

(71) Applicant: ShopperTrak RCT LLC, Chicago, IL (US)

(72) Inventors: Steve Edward Trivelpiece, Rancho Santa Margarita, CA (US); Michael Paolella, Lake Zurich, IL (US); Michelangelo Palella, Chicago, IL (US); Amit R. Patil, Naperville, IL (US)

(73) Assignee: SHOPPERTRAK RCT LLC, Chicago, IL (US)

( * ) Notice: Subject to any disclaimer, the term of this patent is extended or adjusted under 35 U.S.C. 154(b) by 832 days.

(21) Appl. No.: 16/439,357

(22) Filed: Jun. 12, 2019

(65) Prior Publication Data

US 2020/0394589 A1  Dec. 17, 2020

(51) Int. Cl.
*G06V 40/20*  (2022.01)
*G06Q 10/0631*  (2023.01)
*G06Q 10/0639*  (2023.01)
*G06N 20/00*  (2019.01)
*G06V 20/40*  (2022.01)
(Continued)

(52) U.S. Cl.
CPC ... *G06Q 10/06398* (2013.01); *G06F 18/2415* (2023.01); *G06N 20/00* (2019.01); *G06Q 10/06311* (2013.01); *G06V 10/764* (2022.01); *G06V 20/41* (2022.01); *G06V 20/52* (2022.01); *G06V 40/20* (2022.01)

(58) Field of Classification Search
CPC .......... G06Q 10/06398; G06K 9/6277; G06K 9/627; G06N 20/00; G06N 3/006; G06V 20/41; G06V 20/52; G06V 40/20
See application file for complete search history.

(56) References Cited

U.S. PATENT DOCUMENTS

| 7,551,092 B1 * | 6/2009 | Henry | G08B 21/245 340/286.07 |
| 9,305,216 B1 * | 4/2016 | Mishra | G06F 16/583 |

(Continued)

FOREIGN PATENT DOCUMENTS

| EP | 3454267 A1 * | 8/2018 | ............. G06Q 10/06 |
| EP | 3454267 A1 * | 3/2019 | ......... G06K 9/00201 |

*Primary Examiner* — Renae Feacher
(74) *Attorney, Agent, or Firm* — ArentFox Schiff LLP

(57) ABSTRACT

Examples described herein generally relate to a system for monitoring workers in a retail environment. The system may include a plurality of cameras located in different regions of the retail location and configured to capture a video feed of a respective region. The system may include a computer system comprising a memory storing computer executable instructions. The system may provide a video feed of at least one region of the retail environment to a machine learning classifier, the machine learning classifier trained on labeled videos, to classify a sequence of images of a worker into a probability certainty of an activity being performed by the worker. The processor may determine, based on the probability certainties generated by the machine learning classifier over a period of time, an activity schedule of the worker. The system may determine labor productivity statistics based on the activity schedule.

16 Claims, 4 Drawing Sheets

(51) Int. Cl.
*G06V 20/52* (2022.01)
*G06F 18/2415* (2023.01)
*G06V 10/764* (2022.01)

(56) References Cited

U.S. PATENT DOCUMENTS

| | | | |
|---|---|---|---|
| 2013/0027561 A1* | 1/2013 | Lee | H04N 23/611 |
| | | | 705/7.41 |
| 2014/0333775 A1* | 11/2014 | Naikal | H04N 21/44008 |
| | | | 348/159 |
| 2014/0343984 A1* | 11/2014 | Shahabi | G06Q 10/06311 |
| | | | 705/7.13 |
| 2017/0301039 A1* | 10/2017 | Dyer | G06Q 10/063114 |
| 2018/0012080 A1* | 1/2018 | Glaser | G08B 13/196 |
| 2018/0012170 A1* | 1/2018 | Roberts | G06F 16/24578 |
| 2018/0357870 A1* | 12/2018 | Siminoff | G08B 13/19608 |
| 2019/0122036 A1* | 4/2019 | Ward | G06Q 10/06393 |
| 2019/0236924 A1* | 8/2019 | Iwamoto | G08B 21/0446 |
| 2020/0089942 A1* | 3/2020 | Man | G06N 20/00 |
| 2020/0343982 A1* | 10/2020 | Munir | H04B 17/391 |
| 2020/0401795 A1* | 12/2020 | Man | G06N 20/00 |

* cited by examiner

METHODS AND SYSTEMS FOR MONITORING WORKERS IN A RETAIL ENVIRONMENT

BACKGROUND

The present disclosure relates to monitoring retail locations, and more particularly to labor utilization within retail locations.

Retailers employ workers to perform various tasks within a retail location. Workers often have a degree of flexibility and manage competing demands for their time. Managers budget labor costs and attempt to schedule workers to provide the amount of labor necessary to operate the retail location and provide an expected level of customer service. Management of retail locations, however, often lacks information for evaluating workers and labor schedules.

Thus, there is a need in the art for improvements in determining labor utilization. In particular, there is a need for systems and methods for providing effective measurements of labor utilization.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method of monitoring workers in a retail environment. The method may include providing a video feed of at least one region of the retail environment to a machine learning classifier, the machine learning classifier trained on labeled videos, to classify a sequence of images of a worker into a probability certainty of an activity being performed by the worker. The method may include determining, based on the probability certainties generated by the machine learning classifier over a period of time, an activity schedule of the worker. The method may include determining labor productivity statistics based on the activity schedule.

In another aspect, the disclosure provides a system for monitoring workers in a retail environment. The system may include a plurality of cameras located in different regions of the retail location and configured to capture a video feed of a respective region. The system may include a computer system having a memory storing computer executable instructions and a processor configured to execute the instructions. The processor may provide a video feed of at least one region of the retail environment to a machine learning classifier, the machine learning classifier trained on labeled videos, to classify a sequence of images of a worker into a probability certainty of an activity being performed by the worker. The processor may determine, based on the probability certainties generated by the machine learning classifier over a period of time, an activity schedule of the worker. The processor may determine labor productivity statistics based on the activity schedule.

In another aspect, the disclosure provides a non-transitory computer readable medium storing computer executable instructions that may be executed by a processor to monitor workers in a retail environment. The non-transitory computer readable medium may include instructions to provide a video feed of at least one region of the retail environment to a machine learning classifier, the machine learning classifier trained on labeled videos, to classify a sequence of images of a worker into a probability certainty of an activity being performed by the worker. The non-transitory computer readable medium may include instructions to determine, based on the probability certainties generated by the machine learning classifier over a period of time, an activity schedule of the worker. The non-transitory computer readable medium may include instructions to determine labor productivity statistics based on the activity schedule.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for estimating labor utilization metrics for a retail location. The disclosure provides a system that automatically generates an activity schedule for one or more employees that indicates the amount of time spent on various activities. The system may generate metrics for individual employees, groups of employees, or an entire staff.

Current techniques for evaluating labor in a retail environment are limited and often subjective. For example, current techniques often rely on supervisors to report on individual performance. Such techniques often lack information as a supervisor cannot constantly observe workers. Such techniques may also suffer from subjective biases including individual and group biases. Accordingly, the information based and objective technique of the present disclosure may improve evaluation of labor utilization.

In an example, the present disclosure provides a labor evaluation system and methods for generating labor utilization metrics based on recorded video of workers within the retail location. The labor evaluation system provides a video feed of a worker to an activity model. The activity model is a machine-learning model that has been trained on labeled videos of workers performing various activities. The activity model determines a most likely activity being performed by the worker in a video at any given time. The labor evaluation system may then determine an activity schedule of the worker based on the determined activities over a time period. The labor evaluation system may determine labor utilization metrics based on the activity schedule of one or more workers.

Figure 1:
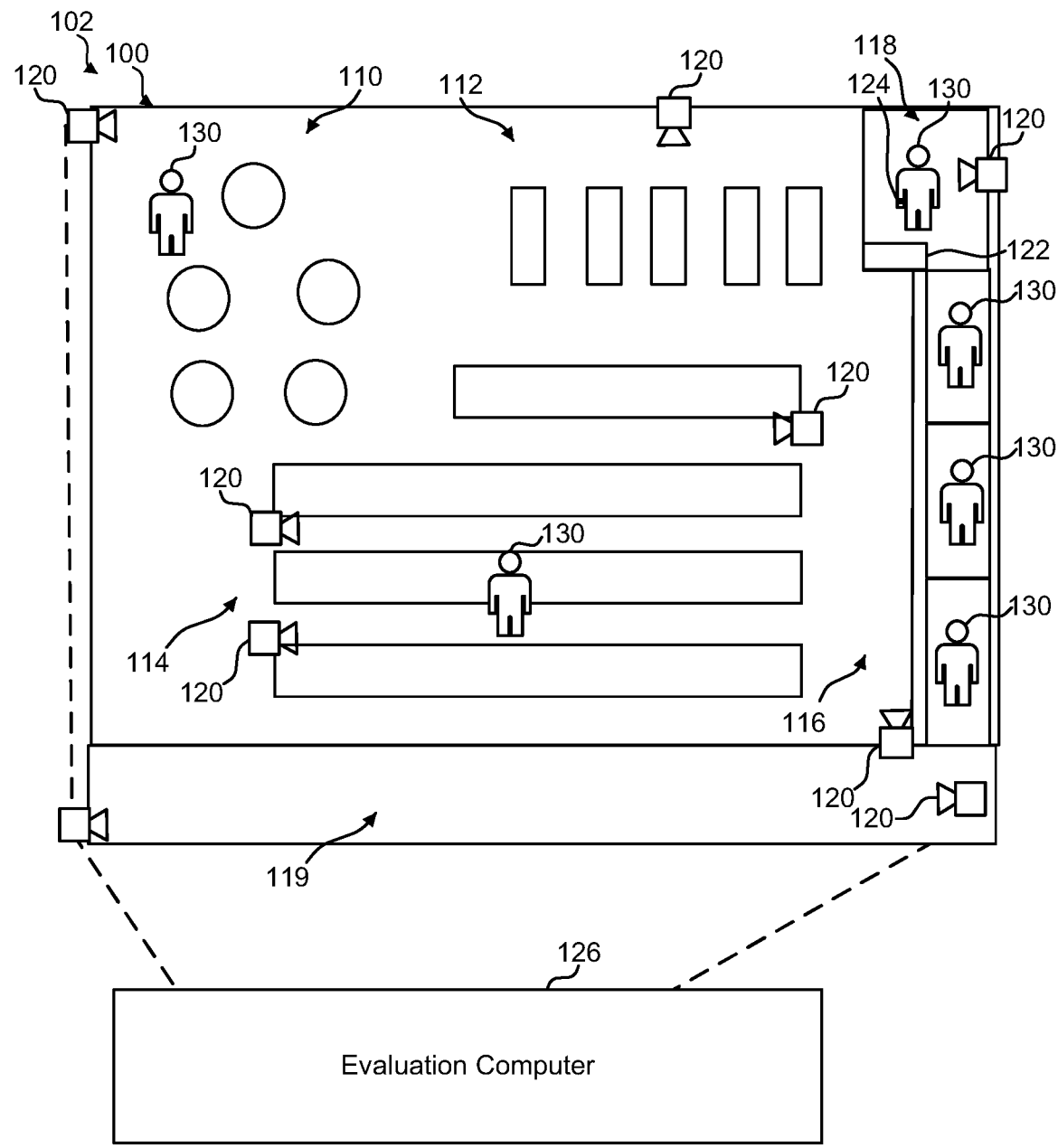
FIG. 1 is a schematic diagram of an example retail location including a labor utilization monitoring system.

Referring now to FIG. 1, an example retail location 100 includes multiple regions where workers may perform various activities that are evaluated by a labor evaluation system 102. For example, the retail location 100 may include an open display area 110, a front end 112, aisles 114, service counters 116, a break room 118, and a storage area 119, which may also be referred to as a back room. A person of skill in the art would understand that the disclosed systems and methods are applicable to a variety of retail locations and the present disclosure is not limited to the example retail location or areas and associated activities thereof.

The labor evaluation system 102 may include multiple cameras 120, one or more worker interfaces 122, tracking devices 124, and an evaluation computer 126.

Each camera 120 may be a digital video camera such as a security camera. The multiple cameras 120 may be located throughout the retail location 100. Each of the cameras 120 may provide a constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the labor evaluation system 102 may move a camera 120 to maintain the field of view of the camera 120 on a worker 130. In another aspect, the labor evaluation system 102 may allow manual control over one or more cameras 120. In an aspect, the labor evaluation system 102 may be integrated with a security or loss prevention system, and the video feed of the cameras 120 may be used for multiple purposes.

The worker interface 122 may be a user interface operated by workers 130 for interaction with the labor evaluation system 102 and/or a separate time recording system. For example, the worker interface 122 may be referred to as a time clock. The worker interface 122 may receive some identification from a worker 130 (e.g., a card and/or a code) and identify the worker 130. The worker interface 122 may also record events such as a work start time, a work stop time, a break start time, and a break end time. The worker interface 122 may be located in the break room 118, for example.

The tracking devices 124 may be any device carried by a worker 130 that provides location and/or movement information regarding the wearer. For example, a tracking device 124 may include one or more accelerometers and/or RFID tags. Examples of tracking devices 124 include smart watches and fitness trackers. A tracking device 124 may record a motion data stream. For example, the motion data stream may include time stamped movement or location events. The motion data stream may be associated with an identification of a person (e.g., worker 130) wearing the tracking device 124. The motion data stream may include a current location of the user, historical information about the location of the user, gestures performed by the user, biometric information (e.g., heartrate), and/or gait. The tracking device 124 may provide the motion data stream continuously to the labor evaluation system 102 via a wireless network, or the tracking device 124 may store the motion data stream for download (e.g., at the end of a shift). In an aspect, the tracking devices 124 may be distributed or controlled by the worker interface 122. For example, the worker interface 122 may identify a tracking device 124, associate the tracking device 124 with a worker 130, and activate the tracking device 124.

The evaluation computer 126 may be any computer device programmed to evaluate at least a video feed from cameras 120 to identify worker activities and generate labor utilization statistics based on the identified activities. The evaluation computer 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing video data.

Figure 2:
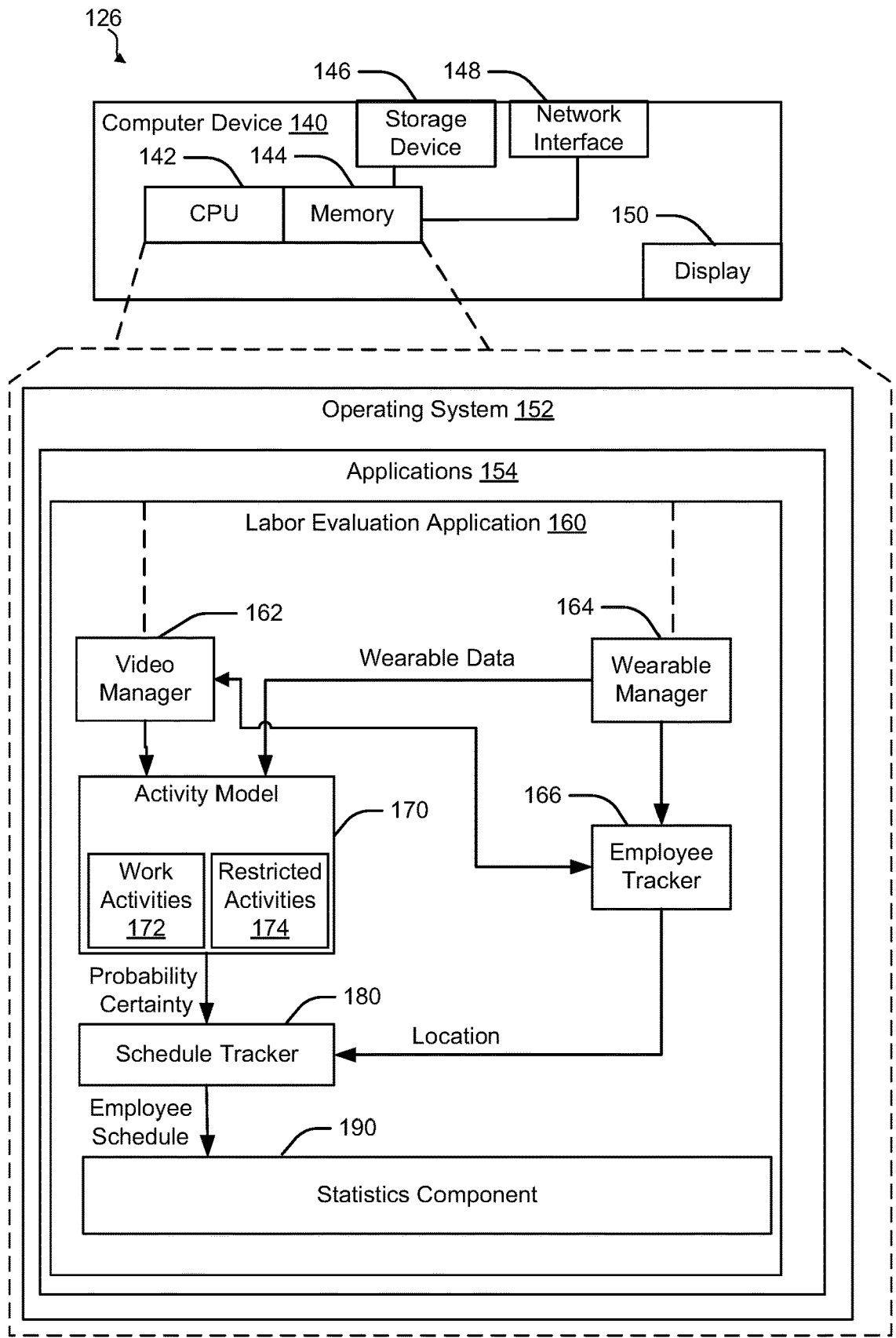
FIG. 2 is a diagram of an example computer system implementing a labor utilization management system.

Turning to FIG. 2, an example computer device 140 may be used to implement the evaluation computer 126. The computer device 140 may include a central processing unit (CPU) 142 that executes instructions stored in memory 144. For example, the CPU 142 may execute an operating system 152 and one or more applications 154, which may include a labor evaluation application 160. The computer device 140 may include a storage device 146 for storing data (e.g., video data streams and motion data streams). The computer device 140 may also include a network interface 148 for communication with external devices via a network. For example, the computer device 140 may communicate with the cameras 120, worker interface 122, and tracking devices 124.

The computer device 140 may include a display 150. The display 150 may be, for example, a computer monitor and/or a touch-screen. The display 150 may provide information to an operator and allow the operator to configure the computer device 140.

Memory 144 may be configured for storing data and/or computer-executable instructions defining and/or associated with an operating system 152 and/or application 154, and CPU 142 may execute operating system 152 and/or application 154. Memory 144 may represent one or more hardware memory devices accessible to computer device 140. An example of memory 144 can include, but is not limited to, a type of memory usable by a computer, such as random access memory (RAM), read only memory (ROM), tapes, magnetic discs, optical discs, volatile memory, non-volatile memory, and any combination thereof. Memory 144 may store local versions of applications being executed by CPU 142. In an implementation, the memory 144 may include a storage device, which may be a non-volatile memory.

The CPU 142 may include one or more processors for executing instructions. An example of CPU 142 can include, but is not limited to, any processor specially programmed as described herein, including a controller, microcontroller, application specific integrated circuit (ASIC), field programmable gate array (FPGA), system on chip (SoC), or other programmable logic or state machine. The CPU 142 may include other processing components such as an arithmetic logic unit (ALU), registers, and a control unit. The CPU 142 may include multiple cores and may be able to process different sets of instructions and/or data concurrently using the multiple cores to execute multiple threads.

The operating system 152 may include instructions (such as applications 130) stored in memory 144 and executable by the CPU 142. The applications 154 may include a labor evaluation application 160 configured to analyze one or more video feeds from the cameras 120 to determine activities performed by a worker 130. In an aspect, the labor evaluation application 160 may analyze a motion data stream to determine a location of the worker 130 and/or assist with the analysis of the video stream. Additionally, the labor evaluation application 160 may determine a schedule for the worker 130 based on the determined activities and determine labor utilization statistics based the worker schedule.

The labor evaluation application 160 may include a video manager component 162. The video manager component 162 may receive a plurality of video feeds from the cameras 120. The video manager component 162 may store the video feeds and metadata identifying each video feed (e.g., area of store). The video manager component 162 may provide video feeds that meet specified criteria to other components as discussed in detail below.

The labor evaluation application 160 may include a wearable manager 164. The wearable manager 164 may receive a plurality of motion data feeds from the tracking devices 124. The wearable manager 164 may store the video feeds and metadata identifying each motion data feed (e.g., the worker 130). The wearable manager 164 may provide motion data feeds that meet specified criteria to other components as discussed in detail below.

The labor evaluation application 160 may include an employee tracker 166. The employee tracker 166 may be configured to determine a location of a worker 130 at a particular time. In an aspect, for example, the employee tracker 166 may track workers 130 starting from a known location (e.g., worker interface 122). The employee tracker 166 may use motion data and/or the video data to determine where the employee is at any time. For example, the employee tracker 166 may use a location provided in the motion data and/or facial recognition of a worker 130 in a particular video to determine the location of the worker 130. The employee tracker 166 may analyze height, gender, age, gait, or uniform of a worker 130 to identify a specific employee and/or to distinguish workers 130 from customers. For example, the employee trackker 166 may re-identify a worker 130 when the worker moves between zones or leaves the field of view of a camera 120. The location of workers 130 may be used to determine the worker 130 in a video when determining an activity being performed. In an aspect, the employee tracker 166 may label or tag video segments with identifiers of workers 130.

The labor evaluation application 160 may include an activity model 170. The activity model 170 may be a machine learning classifier trained on labeled videos, to classify a sequence of images of a worker into a probability certainty of an activity being performed by the worker. That is, the activity model 170 may utilize supervised learning to classify input video and determine a most likely activity. In an aspect, the activity model 170 may be trained using reinforcement learning with a goal to correctly identify an activity being performed in a video segment. The activity model 170 may determine a probability certainty for each activity. The probability certainty may indicate a confidence level of the activity model 170. For example, when the input video stream closely matches the training videos for one activity, the activity model 170 may determine a high probability certainty for that activity. In contrast, when the input video stream is similar to the activity in training videos for different activities, the activity model 170 may determine two or more probability certainties for those activities, each of which may be lower than the high probability certainty when there is a single matching activity.

In an aspect, the activity model 170 may be trained on a set of work activities 172. The work activities 172 may be activities that workers 130 are expected to perform in the retail location 100. Example work activities 172 may include: operating register, operating return counter, stocking shelves, customer engagement, product reset or planogram, back room organization, searching for an item, or cleaning. As discussed above, the labor evaluation system 102 may be applied to various retail locations. In an aspect, the work activities 172 may be customized for a particular retail location. For example, the activity model 170 may be trained based on a training set limited to the particular work activities that occur at a particular retail location. In another aspect, the work activities 172 may be used to limit the output of the activity model 170.

In an aspect, the activity model 170 may be trained on a set of restricted activities 174 in combination with the set of work activities 172. The set of restricted activities may include activities that are forbidden or discouraged at the retail location 100. For example, the set of restricted activities 174 may include videos of using a mobile phone, smoking, talking with other workers 130, or inappropriate contact with customers. Accordingly, the activity model 170 may distinguish between the work activities 172 and the restricted activities 174.

In another aspect, the activity model 170 may optionally be trained based on video streams and a motion data stream. For example, training videos may include a worker 130 performing an activity while wearing the tracking device 124. The motion data stream may be correlated with the video stream. Accordingly, the activity model may classify an activity based on two different streams of data for the activity. Additionally, the use of two data streams may allow classification when one of the streams is unavailable (e.g., obscured video or incorrectly worn tracking device 124).

The labor evaluation application 160 may include a schedule tracker 180. The schedule tracker 180 may determine, based on the probability certainties generated by the activity model 170 over a period of time, an activity schedule of the worker. The period of time may be a work shift of the worker 130. The schedule tracker 180 may determine the work shift based on the start and stop times entered at the worker interface 122. The schedule tracker 180 may determine an activity being performed for a time increment during the work shift. In an aspect, for example, the time increment may be, for example, 1-10 minutes. The schedule tracker 180 may sample the probability certainty of an activity for the worker 130 for each time increment. In an aspect, if the probability certainty for an activity satisfies a threshold, the schedule tracker 180 may determine that the worker 130 was performing the activity. For example, if the schedule tracker 180 determines a 90% probability certainty that the worker 130 was stocking shelves and a 9% probability certainty that the worker 130 was helping a customer select a product, the schedule tracker 180 may attribute the time increment as stocking shelves. The schedule tracker 180 may determine an activity for each worker 130 for each time increment. The determined activities for the time period (e.g., work shift) may be referred to as the activity schedule for the worker 130.

In an aspect, the schedule tracker 180 may adjust the probability certainties based on information on which the activity model 170 is not trained. For example, because the layout of a retail location 100 may be unique, the activity model 170 may not be trained based on areas or regions within the retail location 100. The area or region, however, may be useful for identifying an activity being performed. For example, one or more activities may be associated with each of the regions of the retail location 100. For example, the open display area 110 may be associated with arranging displays, assisting customers, and cleaning, whereas the front end may be associated with scanning items, accepting payment, and bagging items. The schedule tracker 180 may adjust the probability certainty based on the region of the retail location 100 in which the worker 130 was located.

The labor evaluation application 160 may include a statistics component 190. The statistics component 190 may determine labor utilization statistics based on the activity schedule for one or more workers 130. For example, the labor utilization statistics may include a percentage of time spent by a worker 130 on each activity. The labor utilization statistics may include a total amount of time spent on each activity for one or more workers 130 during a time period. The labor utilization statistics may also consider other data that is not obtained from the video. For example, the statistics component 190 may receive a work plan indicating a budgeted amount of labor for one or more activities. The statistics component 190 may determine a labor budget surplus or deficit for each activity by comparing the budgeted amount of labor with the actual amount of labor. The statistics component 190 may determine individual and/or group efficiency for activities based on the budgeted and actual amounts of labor. The individual and/or group efficiency may be used to generate a work plan that optimizes labor utilization for revenue or customer satisfaction. The individual and/or group efficiency may be used to identify coaching opportunities for underperforming employees.

As another example, the labor utilization statistics may include a metric for a quality of work. For instance, the statistics component 190 may correlate sales results to activities performed by workers 130. As another example, the labor evaluation system 102 may also measure a customer traffic density (e.g., using cameras 120), and a number of customers served may be correlated with the activities performed by workers 130. For instance the statistics component 190 may determine what portion of time each worker 130 spends on activities that are defined as appropriate for a zone where the worker 130 is located.

In another aspect, the labor evaluation system 102 may detect customer and/or worker emotional state (e.g., with another machine-learning classifier trained to determine emotional state). The labor evaluation system 102 may determine labor utilization statistics based on the worker emotional state in combination with activities being performed. For example, the labor evaluation system 102 may determine preferred activities based on a percentage of time in a positive emotional state while performing the activity, or disfavored activities based on negative emotional states while performing the activity. In another aspect, the emotional state may be used as a performance metric. In particular, the statistics component 190 may receive a number or percentage of satisfied customers or unhappy customers and a number or percentage of happy or unhappy workers 130. A quality metric may be based on a ratio of the number of happy customers to unhappy workers 130.

Figure 3:
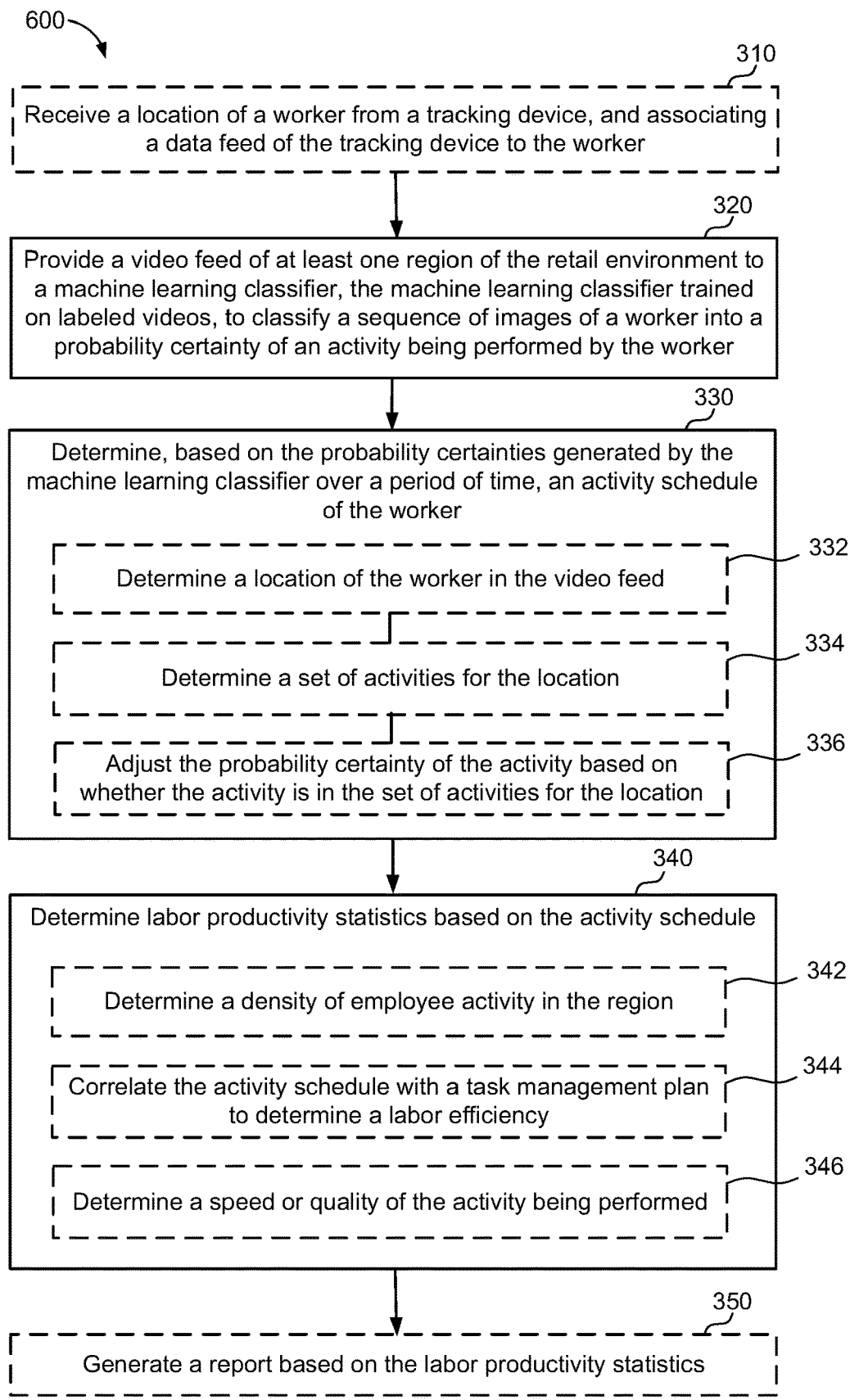
FIG. 3 is a flowchart of an example method of for evaluating a user interface, in accordance with an implementation of the present disclosure.

Turning to FIG. 3, an example method 300 generates labor utilization statistics for a retail location 100. For example, method 300 may be performed by the user labor evaluation application 160 on the computer device 140. Optional blocks are shown with dashed lines.

At block 310, the method 300 may optionally include receiving a location of the worker from a wearable device, and associating a data feed of the wearable device to the worker. In an aspect, for example, the wearable manager 164 may receive a location of the worker 130 from a tracking device 124, and associate a data feed of the tracking device 124 to the worker.

At block 320, the method 300 may include providing a video feed of at least one region of the retail environment to a machine learning classifier, the machine learning classifier trained on labeled videos, to classify a sequence of images of a worker into a probability certainty of an activity being performed by the worker. In an aspect, for example, the video manager component 162 may provide the video feed of at least one region of the retail location 100 to a machine learning classifier (e.g., the activity model 170), the machine learning classifier trained on labeled videos, to classify a sequence of images of a worker into a probability certainty of an activity being performed by the worker. For instance, the activities being performed by the worker may be selected from a set of work activities 172 for the retail location 100 that correspond to the labels of the labeled videos. In another aspect, the activities being performed by the worker may be selected from a set of restricted activities 174 for the retail location 100 that correspond to the labels of the labeled videos. In the case where a data feed of the tracking device 124 is associated with the worker, the machine learning classier may be trained on the combination of the video and the corresponding data feed of the tracking device 124 for the labeled activity.

At block 330, the method 300 may include determining, based on the probability certainties generated by the machine learning classifier over a period of time, an activity schedule of the worker. In an aspect, for example, the schedule tracker 180 may determine, based on the probability certainties generated by the activity model 170 over a period of time, an activity schedule of the worker.

At sub-block 332, determining the activity schedule in block 330 may optionally include determining a location of the worker in the video feed. For example, the location may be based on a field of view of the camera 120, a location determined by the tracking device 124, an identification of the worker, or image recognition of the worker. In an aspect, for example, determining the location of the worker may include identifying the worker at a first location (e.g., worker interface 122) and tracking the location of the identified worker to the location of the worker in the video feed.

At sub-block 334, the block 330 may optionally include determining a set of activities for the location. In an aspect, for example, the schedule tracker 180 may be configured with the set of activities for the location. The set of activities may be a subset of the work activities 172 and/or the restricted activities 174.

At sub-block 336, the block 330 may optionally include adjusting the probability certainty of the activity based on whether the activity is in the set of activities for the location. In an aspect, for example, the schedule tracker 180 may adjust the probability certainty of the activity based on whether the activity is in the set of activities for the location. For example, the schedule tracker 180 may add an adjustment amount to the probability certainty for activities in the set of activities for the location or subtract the adjustment amount for activities that are not in the set of activities for the location. Alternatively, the schedule tracker 180 may adjust an acceptance threshold based on whether the activity is in the set of activities for the location.

At block 340, the method 300 may include determining labor productivity statistics based on the activity schedule. In an aspect, for example, the statistics component 190 may determine the labor productivity statistics based on the activity schedule.

At sub-block 342, the block 340 may optionally include determining a density of employee activity in the region. For example, the statistics component 190 may determine a number of workers 130 performing an activity within a region of the retail location at any particular time. The density of employee activity may be indicative of a high demand for the activity or an inefficiency in performing the activity. The density of employee activity may, for example, be compared to a customer density for the region at the time.

At sub-block 344, the block 340 may optionally include correlating the activity schedule with a task management plan to determine a labor efficiency. In an aspect, for example, the statistics component 190 may correlate the activity schedule with the task management plan to determine the labor efficiency. The task management plan may indicate a budgeted or expected amount of time for a particular activity. The statistics component 190 may, for example, divide a total actual amount of time one or more workers 130 spent on an activity by the budgeted amount of time to determine the labor efficiency for that activity.

At sub-block 346, the block 340 may optionally include determining a speed or quality of the activity being performed. For example, the statistics component 190 may determine a total time a worker 130 spent to complete the activity. The statistics component 190 may determine the quality of the activity by correlating the worker activity to a relevant quality metric such as sales, customer density, or detected customer happiness.

At block 350, the method 300 may optionally include generating a report based on the labor productivity statistics. In an aspect, for example, the statistics component 190 may generate a labor plan based on the labor productivity statistics. For example, the statistics component 190 may determine a labor budget for one or more activities based on previous labor efficiency statistics for each activity. The labor plan may include an assignment of activities to particular workers, for example, based on individual efficiency at a particular activity. As another example, the statistics component 190 may compare statistics for two or more retail locations for the same business.

Figure 4:
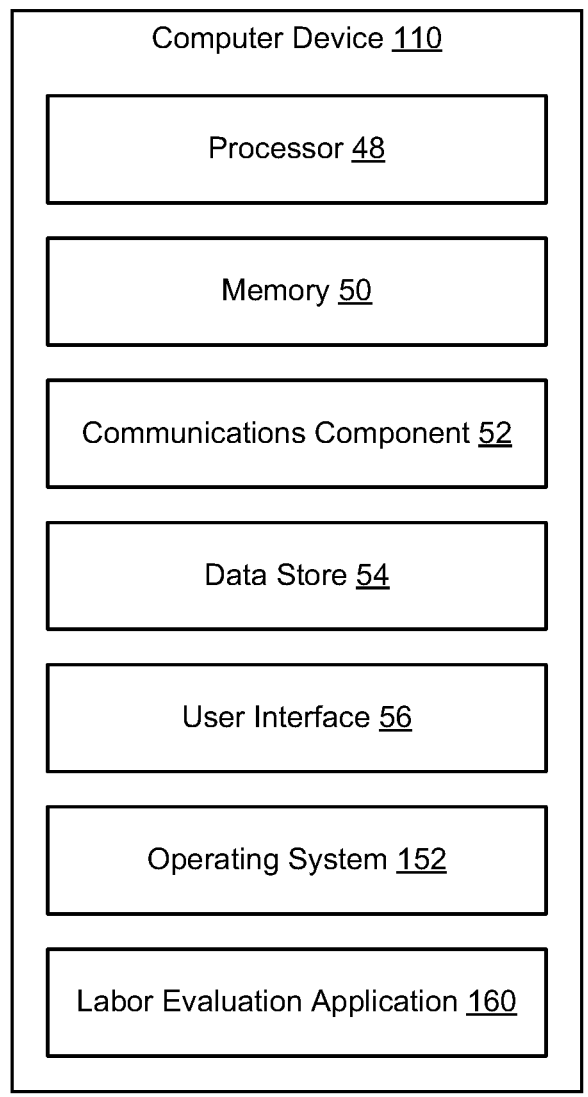
FIG. 4 is a schematic block diagram of an example computer device, in accordance with an implementation of the present disclosure.

Referring now to FIG. 4, illustrated is an example computer device 140 in accordance with an implementation, including additional component details as compared to FIG. 2. In one example, computer device 140 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 142.

In an example, computer device 140 may include memory 50 for storing instructions executable by the processor 48 for carrying out the functions described herein. In an implementation, for example, memory 50 may include memory 144. The memory 50 may include instructions for executing the labor evaluation application 160.

Further, computer device 140 may include a communications component 52 that provides for establishing and maintaining communications with one or more parties utilizing hardware, software, and services as described herein. Communications component 52 may carry communications between components on computer device 140, as well as between computer device 140 and external devices, such as devices located across a communications network and/or devices serially or locally connected to computer device 140. For example, communications component 52 may include one or more buses, and may further include transmit chain components and receive chain components associated with a transmitter and receiver, respectively, operable for interfacing with external devices.

Additionally, computer device 140 may include a data store 54, which can be any suitable combination of hardware and/or software, that provides for mass storage of information, databases, and programs employed in connection with implementations described herein. For example, data store 54 may be a data repository for operating system 152 and/or applications 154. The data store may include memory 144 and/or storage device 146.

Computer device 140 may also include a user interface component 56 operable to receive inputs from a user of computer device 140 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 152 and/or applications 154. In addition, processor 48 may execute operating system 152 and/or applications 154, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A system for monitoring workers in a retail environment, comprising:
    a plurality of cameras located in different regions of the retail environment and configured to capture a video feed of a respective region;
    a worker interface configured to receive identification from a worker and identify the worker; and
    a computer system comprising a memory storing computer executable instructions and a processor configured to execute the instructions to:
        receive a video feed of at least one region of the retail environment from at least one of the plurality of cameras;
        identify a worker at the worker interface based on input to the worker interface;
        track a location of the identified worker from a first region including the worker interface to a second region including a location of the worker in the video feed of the second region, wherein tracking the location of the identified worker comprises:
            re-identifying the worker in the video feed of the second region based on one or more of height, gender, age, gait, or uniform when the worker leaves the video feed of the first region; and
            moving at least one camera of the plurality of cameras to maintain a field of view of the camera on the worker;
        provide the video feed of the second region of the retail environment to a machine learning classifier, the machine learning classifier trained on labeled videos, to classify a sequence of images of a worker into a probability certainty of an activity being performed by the worker;
        determine a set of activities for the location of the worker in the video feed of the second region;
        adjust the probability certainty of the activity based on whether the activity is in the set of activities for the location of the worker in the video feed of the second region by adding an adjustment amount to the probability certainty for the activity if the activity is in the set of activities for the location and subtracting the adjustment amount if the activity is not in the set of activities for the location;
        determine, based on probability certainties generated by the machine learning classifier over a period of time, an activity schedule of the worker; and
        determine labor productivity statistics based on the activity schedule.

2. The system of claim 1, further comprising a wearable device associated with the worker and including one or more accelerometers configured to record a motion data stream of the worker, wherein the processor is configured to execute the instructions to:
    identify a wearable device, associate the wearable device with a worker, and activate the wearable device in response to the input to the worker interface;
    receive a location and the motion data stream of the worker from the wearable device.

3. The system of claim 2, wherein the labeled videos are also associated with a corresponding data feed of the wearable device for the activity, wherein the machine learning classifier is trained on a combination of the labeled videos and the corresponding data feed of the wearable device for the labeled activity to classify the sequence of images of the worker and the motion data stream from the wearable device associated with the worker into the probability certainty of the activity being performed by the worker.

4. The system of claim 1, wherein the activity being performed by the worker is selected from a set of work activities for the retail environment that correspond to labels of the labeled videos during training of the machine learning classifier using reinforcement learning with a goal to correctly identify an activity being performed in a video segment.

5. The system of claim 4, wherein the activities being performed by the worker are also selected from a set of restricted activities for the retail environment that correspond to the labels of the labeled videos during the training of the machine learning classifier, wherein the machine learning classifier is trained to distinguish between the work activities and the restricted activities.

6. The system of claim 1, wherein the instructions to determine the labor productivity statistics based on the activity schedule comprise instructions to determine a density of employee activity in the at least one region, correlate the activity schedule with a task management plan to determine a labor efficiency, or determine a quality of the activity being performed.

7. A method of monitoring workers in a retail environment, comprising:
    receiving video feeds from a plurality of cameras located in different regions of the retail environment and configured to capture a video feed of a respective region of the retail environment;
    determining a location of the worker in the video feed, wherein determining the location of the worker in the video feed comprises identifying the worker at a first location in a video feed of a first region based on input to a worker interface and tracking the location of the identified worker from the first region including the first location to a second region including the location of the worker in the video feed of the second region, wherein tracking the location of the identified worker comprises re-identifying the worker in the video feed of the second region based on one or more of height, gender, age, gait, or uniform when the worker leaves the video feed of the first region and moving at least one camera of the plurality of cameras to maintain a field of view of the camera on the worker;
    providing the video feed of the second region of the retail environment to a machine learning classifier, the machine learning classifier trained on labeled videos, to classify a sequence of images of a worker into a probability certainty of an activity being performed by the worker;
    determining, based on probability certainties generated by the machine learning classifier over a period of time, an activity schedule of the worker, wherein determining the activity schedule of the worker comprises:
        determining a set of activities for the location of the worker in the video feed of the second region; and
        adjusting the probability certainty of the activity based on whether the activity is in the set of activities for the location of the worker in the video feed of the second region by adding an adjustment amount to the probability certainty for the activity if the activity is in the set of activities for the location and subtracting the adjustment amount if the activity is not in the set of activities for the location; and
    determining labor productivity statistics based on the activity schedule.

8. The method of claim 7, wherein the activity being performed by the worker is selected from a set of work activities for the retail environment that correspond to labels of the labeled videos during training of the machine learning classifier using reinforcement learning with a goal to correctly identify an activity being performed in a video segment.

9. The method of claim 8, wherein the activities being performed by the worker are selected from a set of restricted activities for the retail environment that correspond to the labels of the labeled videos during the training of the machine learning classifier, wherein the machine learning classifier is trained to distinguish between the work activities and the restricted activities.

10. The method of claim 7, further comprising:
    identifying a wearable device, associating the wearable device with the worker, and activating the wearable device in response to the input to the worker interface;
    receiving a location of the worker and a motion data stream from the wearable device including one or more accelerometers configured to record the motion data stream of the worker; and
    associating the motion data stream from the wearable device to the worker.

11. The method of claim 10, wherein the labeled videos are also associated with a corresponding data feed of the wearable device for the activity, wherein the machine learning classifier is trained on a combination of the labeled videos and the corresponding data feed of the wearable device for the labeled activity to classify the sequence of images of the worker and the motion data stream from the wearable device associated with the worker into the probability certainty of the activity being performed by the worker.

12. The method of claim 7, further comprising generating a labor plan based on the labor productivity statistics.

13. The method of claim 7, wherein determining the labor productivity statistics based on the activity schedule comprises determining a density of employee activity in the region.

14. The method of claim 7, wherein determining the labor productivity statistics comprises correlating the activity schedule with a task management plan to determine a labor efficiency.

15. The method of claim 7, wherein determining the labor productivity statistics based on the activity schedule comprises determining a speed or quality of the activity being performed.

16. A non-transitory computer readable medium storing computer executable instructions that when executed by a processor cause the processor to:
    receive video feeds from a plurality of cameras located in different regions of a retail environment and configured to capture a video feed of a respective region of the retail environment;
    determine a location of a worker in the video feed by identifying the worker at a first location in a first region based on input to a worker interface,
    track the location of the identified worker from the first region including the first location to a second region including the location of the worker in the video feed of the second region, wherein tracking the location of the identified worker comprises:
        re-identifying the worker in the video feed of the second region based on one or more of height, gender, age, gait, or uniform when the worker leaves the video feed of the first region; and moving at least one camera of the plurality of cameras to maintain a field of view of the camera on the worker;

provide the video feed of the second region of the retail environment to a machine learning classifier, the machine learning classifier trained on labeled videos, to classify a sequence of images of a worker into a probability certainty of an activity being performed by the worker;

determine a set of activities for the location of the worker in the video feed of the second region;

adjust the probability certainty of the activity based on whether the activity is in the set of activities for the location of the worker in the video feed of the second region by adding an adjustment amount to the probability certainty for the activity if the activity is in the set of activities for the location and subtracting the adjustment amount if the activity is not in the set of activities for the location;

determine, based on probability certainties generated by the machine learning classifier over a period of time, an activity schedule of the worker; and determine labor productivity statistics based on the activity schedule.

* * * * *